Figure 1:
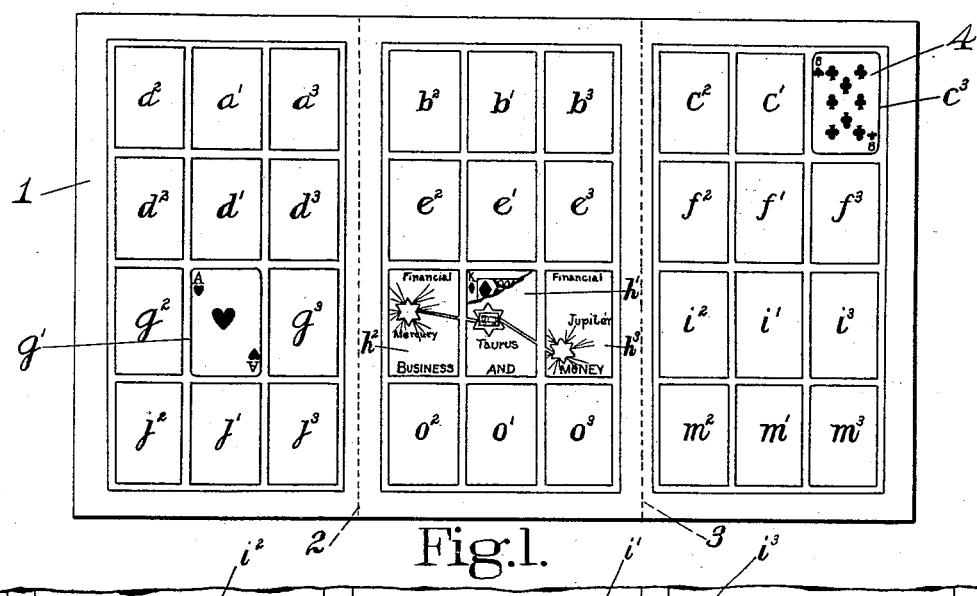

J. W. HANLEY.
GAME.
APPLICATION FILED AUG. 31, 1910. RENEWED OCT. 2, 1911.

1,016,142.

Patented Jan. 30, 1912.

WITNESSES:
G. Gustave Walz.
Joseph G. Orr

INVENTOR
John W. Hanley

COLUMBIA PLANOGRAPH CO., WASHINGTON, D. C.

UNITED STATES PATENT OFFICE.

JOHN W. HANLEY, OF NEW YORK, N. Y.

GAME.

1,016,142.      Specification of Letters Patent.      Patented Jan. 30, 1912.

Application filed August 31, 1910, Serial No. 579,867. Renewed October 2, 1911. Serial No. 652,413.

*To all whom it may concern:*

Be it known that I, JOHN W. HANLEY, a citizen of the United States, residing at New York, in the county and State of New York, have invented certain new and useful Improvements in Games, of which the following is a specification, like letters in the drawings and specification designating like parts.

This invention relates to games, and is of special utility when embodied in a game employing ordinary "playing cards, although I contemplate the utilization of my improvements in any field for which they may be adapted by their nature.

An important object of my invention is to provide a game chart constructed and arranged to receive the counters or objects used in the game, such as the aforesaid playing cards, permitting various permutations and combinations of the counters, according to the pleasure of the person playing the game and in accordance with the rules adopted by the player, the chart preferably being provided with divisions respectively adapted to receive individual counters, and certain of these divisions bearing indicia which, observed in connection with the particular cards thereupon, at each observation, serve to determine the result of the play.

Another object of importance is to provide in convenient form for reference, as for example in a book, a series of readings or statements of the aforesaid results, these readings respectively bearing indicia by which the player may identify therein the reading and thus ascertain the result indicated by the presence of any given counter upon any given portion of the game chart.

Among other notable objects of my invention is the arrangement of the chart with certain of the divisions in groups wherein the individual divisions composing each group possess common characteristics, which are preferably indicated by arbitrarily chosen symbols visualized upon the chart, as by printing, and in correspondence with these groups the readings in the book may be arranged in groups, each group having a sub-title corresponding to one of the chart-division-groups, and this sub-title may appear in its appropriate place upon the chart in addition to the aforesaid symbol.

The various features of my invention will be illustrated and described fully in the accompanying drawing and specification and pointed out in the claims.

Figure 2:
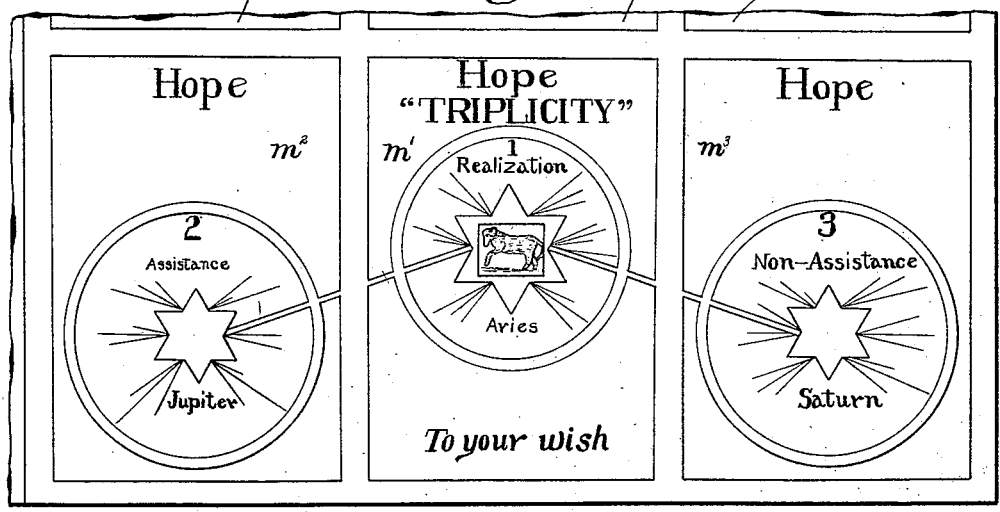
Figure 3:
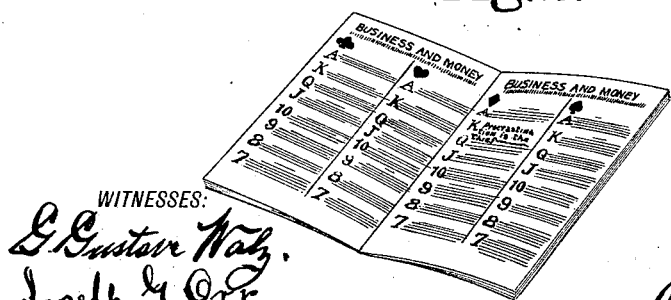
Figure 4:
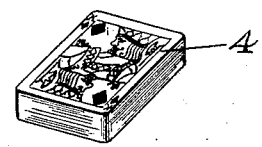

In the drawings, Figure 1 is a plan view of a game-chart, in the construction of which my invention has been embodied, with several of the playing cards constituting the counters in place; Fig. 2 is a similar, fragmentary, view on a larger scale showing one group of subdivisions of the chart illustrated in Fig. 1; Fig. 3 is a view of the book of readings employed in playing the game, open at the place indicated by the position of certain of the counters, and Fig. 4 is a view in perspective of a pack of playing cards.

In the embodiment of my invention selected for illustration and description to enable ready and complete understanding of my improvements, the part designated by the reference numeral 1 is a chart which may be of any suitable material, such as pasteboard covered with paper, and of any suitable size and contour, being oblong, in the instance illustrated and arranged to fold along the dotted lines 2 and 3, for the sake of convenience in carriage and storage.

In accordance with my invention, the chart is provided with subdivisions, of any suitable number, shape and relative position, these divisions being in the instance illustrated of about the size and shape of an ordinary playing card 4, as the embodiment of my invention herein illustrated is designed for use with part of an ordinary pack of playing cards, thirty-three in all, including the king, queen, jack, ten, nine, eight, seven and ace of each suit, and the joker, and the subdivisions are designated for the sake of brevity by the reference characters $a^1$, $a^2$, $a^3$; $b^1$, $b^2$, $b^3$, &c., those bearing the same letter of the alphabet constituting a group, or "triplicity", as I term each group of three, of which group there may be twelve cards corresponding to the twelve "houses" of the zodiac.

In Fig. 2 is shown on a larger scale the group $m^1$, $m^2$, $m^3$, in detail, and it will be understood that the other groups and their divisions may be provided similarly with distinctive features, the different groups differing in details, preferably, so as to render each group readily distinguishable from other groups.

For this purpose, the middle division of the group $m^1$, $m^2$, $m^3$, bears the symbol of a ram, the sign "Aries" in the zodiac, with the name thereof, and each division of the group bears also the common group word "Hope", while the individual divisions of the group are differentiated from each other by the words "Realization", "Assistance" and "Non-assistance" applied to them respectively, and the division $m^2$ is still further distinguished by the name "Jupiter" and the division $m^3$ by the name "Saturn", as convenient marks of distinction. The words "To your wish" are also found in the division $m^1$.

To illustrate still further the distinction between groups, the "triplicity" or group $h^1$, $h^2$, $h^3$, may be considered the "financial" group, its middle division $h^1$ bearing the zodiacal symbol of the bull, the name thereof, "Taurus" and the words "Business and money", while the division $h^2$ of the same group is designated by the name "Mercury" and the division $h^3$ by the name "Jupiter".

In accordance with my invention the counters are placed upon the divisions respectively until the desired number of divisions have each one or more cards, and then the player observes each card and the division upon which it is found, and notes a result of his play which corresponds to a predetermined assignment to each division of a particular significance when occupied by the counter of a given denomination. For example, when the king of diamonds is found, as shown, upon division $h^1$, the significance of that juxtaposition may be stated as follows: "Procrastination is the thief of time, money, fame and power. Do it now." Similarly, if all the divisions be occupied in turn by counters, and read successively, as for example, in the order $a^1$, $a^2$, $a^3$, $b^1$, $b^2$, $b^3$, $c^1$, $c^2$, $c^3$, $d^1$, $d^2$, &c., a more or less connected series of results will be exhibited in the predetermined significations associated with the presence of the several cards each upon the respective division where it may be found after the emplacement of the cards upon the chart. A different series of readings may result owing to reassortment of the counters prior to their emplacement, as for example, by shuffling the cards in usual fashion.

The general subject of the reading may be selected arbitrarily by the player in advance, as for example by choosing some wished-for object, and each result indicated during the play by the presence of a card upon a given division will be interpreted by the player as bearing upon the quest of the desired object.

In accordance with another feature of my invention the significations associated with the presence of the counters respectively in the different divisions respectively may be collated in convenient form as in the book shown in Fig. 3, in which the pages shown contain results for the financial group or "triplicity" "Business and money" and at the head of the page appear the symbols of the suits, club, heart, diamond, spade, while in a column below each symbol the characters A, K, Q, J, 10, 9, 8, 7, indicate the several cards of each suit, and the results are printed in text opposite each; e. g., opposite the king of diamonds appears the result "Procrastination is the thief of time, money, fame and power. Do it now", already quoted by way of example.

As a further illustration of the game, the following exemplary rules for play may be observed:

1. Shuffle the cards thoroughly, cut twice, while doing so make a wish, then stack the three piles, putting center one on the bottom.

2. Draw one card at a time, (they may be spread face downward on a table, for convenience), and cover in turn the nine divisions across the top of the chart, placing each card face downward.

3. Take up the cards in order, from left to right, reading in the book the answers indicated, in their turn, and then lay aside the nine cards.

4. Draw nine more cards, one at a time, and place on the second line of divisions across the chart, read the answers to these, and continue to draw and place the cards until the last of the thirty-three are placed upon the middle group of the lowest row of divisions $o^1$, $o^2$, $o^3$. After the final answer, the player may proceed to "The wish", as follows:

5. Place the "wish card"—nine of hearts —on the center of the chart, face downward.

6. Choose two other cards, as for example, a queen and a jack, and placing these two cards alongside of the "wish card", shuffle all three about until their identity is lost.

7. Slide these three cards into the "triplicity" of "Hope" (divisions $m^1$, $m^2$, $m^3$), after which turn all three face upward. If the "wish card" appears upon the division marked "Realization", the indication is favorable to the wish. Should it appear upon the division marked "Assistance", the indication is for delay in the realization of the wish. Appearing upon the division marked "Non-assistance", the indication is unfavorable to realization of the wish.

Having illustrated and described my invention thus fully, and a convenient mode of putting it into practice, I wish it understood that I do not limit myself to the specific construction and arrangement of parts, and materials, selected for illustration and description, nor do I limit myself in general, otherwise than as set forth in the claims read in connection with this specification.

What I claim, and desire to secure by Letters Patent of the United States of America, is:—

1. A game; comprising a set of individually distinguishable counters, and a chart provided with divisions to receive said counters, said divisions having indicia which in conjunction with given counters, afford predetermined significations to the player; substantially as described.

2. A game; comprising a set of individually distinguishable cards; a chart, having individually distinguishable divisions to receive said cards respectively; and a compilation of reading matter in paragraphs identifiable in correspondence with combinations of the indicia on said cards and divisions; substantially as described.

3. A game; comprising a set of cards containing a plurality of separately graded suits; a game-chart having card-receiving divisions arranged in a series of groups; and a book containing paragraphs of reading matter arranged under a plurality of sub-titles, corresponding to said groups, and identifiable individually with individual cards in said suits respectively; substantially as described.

4. A game; comprising a set of cards containing a plurality of separately graded suits; a game-chart having card-receiving divisions arranged in a series of groups, each group bearing a sign of the zodiac; and a book containing paragraphs of reading matter relating to phases of human life, and means to identify said paragraphs respectively with the conjunction of given cards with given divisions in the play of said game.

JOHN W. HANLEY.

Witnesses:
  JOHN SIMPSON,
  MATILDA KESSLER.

---

Copies of this patent may be obtained for five cents each, by addressing the "Commissioner of Patents, Washington, D. C."